United States Patent
Pignataro et al.

(10) Patent No.: US 11,979,403 B2
(45) Date of Patent: May 7, 2024

(54) TOKEN-BASED DEVICE TRACKING

(71) Applicant: Cisco Technology, Inc., San Jose, CA (US)

(72) Inventors: Carlos M. Pignataro, Cary, NC (US); Nagendra Kumar Nainar, Morrisville, NC (US); Jerome Henry, Pittsboro, NC (US); Robert E. Barton, Richmond (CA); Bart A. Brinckman, Nevele (BE)

(73) Assignee: Cisco Technology, Inc., San Jose, CA (US)

( * ) Notice: Subject to any disclaimer, the term of this patent is extended or adjusted under 35 U.S.C. 154(b) by 317 days.

(21) Appl. No.: 17/332,589

(22) Filed: May 27, 2021

(65) Prior Publication Data
US 2022/0385661 A1 Dec. 1, 2022

(51) Int. Cl.
*H04L 29/06* (2006.01)
*H04L 9/32* (2006.01)
*H04L 9/40* (2022.01)

(52) U.S. Cl.
CPC ............ *H04L 63/10* (2013.01); *H04L 9/3236* (2013.01); *H04L 9/3263* (2013.01); *H04L 63/0876* (2013.01)

(58) Field of Classification Search
CPC ..... H04L 63/10; H04L 9/3236; H04L 9/3263; H04L 63/0876; H04L 63/0815; H04L 9/0877; H04L 63/0823; H04L 9/3271
USPC .......................................................... 726/9
See application file for complete search history.

(56) References Cited

U.S. PATENT DOCUMENTS

| | | | |
|---|---|---|---|
| 2014/0173124 A1* | 6/2014 | Velayudhapillai | H04W 8/26 709/228 |
| 2017/0013449 A1* | 1/2017 | Raman | H04W 12/06 |
| 2019/0028892 A1 | 1/2019 | Henry et al. | |
| 2019/0028893 A1 | 1/2019 | Lee et al. | |
| 2020/0007545 A1 | 1/2020 | Morrill et al. | |
| 2020/0275272 A1 | 8/2020 | Montemurro et al. | |
| 2020/0322334 A1 | 10/2020 | Sheth et al. | |

OTHER PUBLICATIONS

Trusted Computing Group, "TPM Secures Wireless Access Points," Date Publised: Jan. 1, 2015 [Accessed Online Jun. 2, 2021] https://trustedcomputinggroup.org/tpm-secures-wireless-access-points/.
H. Fouchal, J. Biesa, E. Romero, A. Araujo and O. N. Taladrez, "A Security Scheme for Wireless Sensor Networks," 2016 IEEE Global Communications Conference (GLOBECOM), 2016, pp. 1-5, doi: 10.1109/GLOCOM.2016.7841544. [Abstract Only].

(Continued)

*Primary Examiner* — Tu T Nguyen
(74) *Attorney, Agent, or Firm* — Patterson + Sheridan, LLP

(57) ABSTRACT

Embodiments herein describe disconnecting, by an access node, a first device having a first media access control (MAC) address due to a network violation and receiving, by the access node, information about a second device having a second MAC address different from the first MAC address. In one embodiment, the information is generated by a certificate server based on a token generated by the second device. Further, when the access node determines, based on the information, that the second device is the first device, the access node denies a connection request from the second device.

10 Claims, 6 Drawing Sheets

(56) References Cited

OTHER PUBLICATIONS

N. K. K. and M. J. Nene, "Chip-Based Key Distribution Technique for Security Enhancement in Hierarchical Wireless Sensors Networks," 2017 IEEE 7th International Advance Computing Conference (IACC), 2017, pp. 333-338, doi: 10.1109/IACC.2017.0079. [Abstract Only].

Donglai Fu and Xinguang Peng, "TPM-Based Remote Attestation for Wireless Sensor Networks," Tsinghua Science and Technology, ISSN 1007-0214 07/11 pp. 312-321, vol. 21, No. 3, Jun. 2016, 10 pages.

M, Niranjan M. and Kenchaiah, Nagaraj, "Authenticated Route Discovery in Wireless Mesh Networks", Technical Disclosure Commons, (May 19, 2020).

\* cited by examiner

TOKEN-BASED DEVICE TRACKING

TECHNICAL FIELD

Embodiments presented in this disclosure generally relate to device tracking. More specifically, embodiments disclosed herein relate to token-based device tracking.

BACKGROUND

A device can connect to an access node in a network to communicate information to other devices over the network. Traditionally, the access node identifies and tracks the device using a media access control (MAC) address of the device, which was assumed to be static. The device, however, may use non-static MAC addresses. If the access node assumes that the device's MAC address is static, then when the device commits a network violation and is disconnected by the access node, the device may simply reconnect to the access node after changing its MAC address, which may jeopardize the security or performance of the access node and the network.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

According to an embodiment, a method includes disconnecting, by an access node, a first device having a first media access control (MAC) address due to a network violation and receiving, by the access node, information about a second device having a second MAC address different from the first MAC address. The information is generated by a certificate server based on a token generated by the second device. The method also includes determining, by the access node and based on the information, that the second device is the first device and denying, by the access node, a connection request from the second device based on determining that the second device is the first device. Other embodiments include an access node that performs this method.

According to another embodiment, a method includes receiving, by a user device, a request for a token from one of an access node or an identity provider and in response to the request, generating the token using a trusted platform module of the user device. The method also includes communicating, by the user device, the token to one of the access node or the identity provider. An access decision for the user device is made based on the token. Other embodiments include an apparatus that performs this method.

Example Embodiments

This disclosure describes a process by which an access node tracks the identity of a user device if the user device rotates or changes media access control (MAC) addresses. When the device attempts to connect to the access node, the access node or an identity provider of an identity federation communicates a request to the user device to challenge the user device to provide a token generated by the trusted platform module (TPM) of the user device. The user device generates and communicates the token to the access node or the identity provider. The access node or the identity provider then validates the token with a certificate authority. The certificate authority also communicates, to the access node or the identity provider, information that identifies the user device. The access node compares this information with information in a database to determine whether the user device is a device that was previously disconnected due to a network violation. The access node then makes an access decision for the user device. In this manner, the access node in an identity federation can determine the identity of the user device when the user device rotates or changes MAC addresses.

Figure 1:
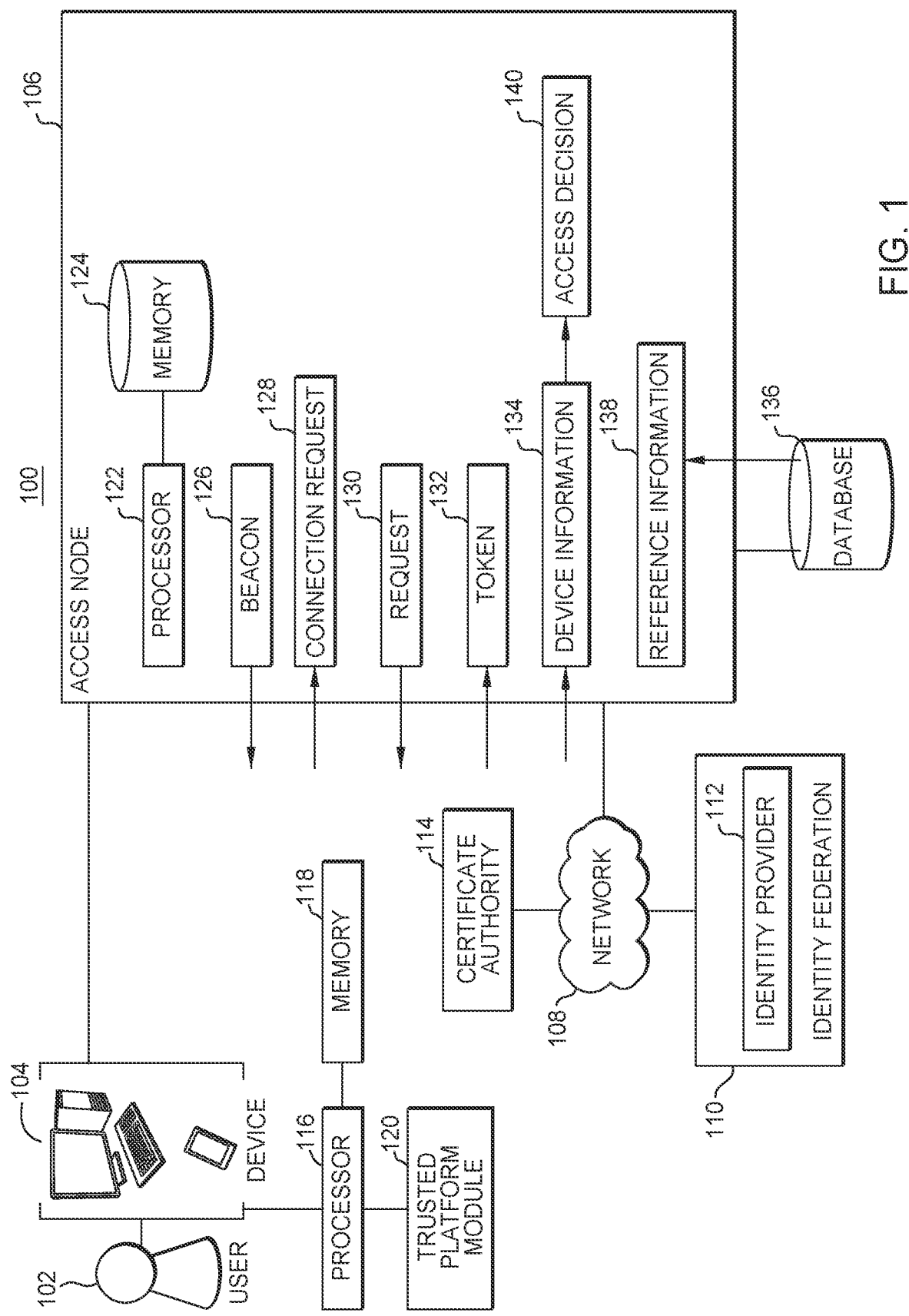
FIG. 1 illustrates an example system.

FIG. 1 illustrates an example system 100. As seen in FIG. 1, the system 100 includes one or more devices 104, an access node 106, a network 108, an identity federation 110 that includes one or more identity providers 112, and a certificate authority 114. The access node 106 and/or the identity federation 110 track the identity of the device 104 by challenging a trusted platform module (TPM) of the device 104 to generate a token. The certificate authority 114 may validate the token and provide device information to the identity federation 110 and/or the access node 106. The device information may be compared with reference information in a database to determine the identity of the device 104. In this manner, even if the device 104 changes or rotates its MAC address, the access node 106 may determine the actual identity of the device 104 and make an appropriate access decision, in particular embodiments.

A user 102 uses the device 104 to connect to the network 108 through the access node 106. The device 104 may communicate and interact with other components of the system 100 through this connection. The device 104 may change or rotate its MAC address to maintain or enhance the privacy of the user 102 or the device 104. For example, by rotating or changing the MAC address, it may become more difficult to track or log the communications of the user 102 or the device 104 based on the MAC address. As seen in FIG. 1, the device 104 includes a processor 116 and a memory 118, which are configured to perform any of the actions or functions of the device 104 described herein. Additionally, the device 104 includes a TPM 120 that uses a key to generate a token when requested. In particular embodiments, the TPM 120 generates tokens that are used to track the identity of the device 104, even when the device 104 changes or rotates its MAC address.

The device 104 is any suitable device for communicating with components of the system 100. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may also include a user interface, such as a display, a microphone, keypad, or other appropriate terminal equipment usable by the user 102. A software application designed using software code may be stored in the memory 118 and executed by the processor 116 to perform the functions of the device 104.

The processor 116 is any electronic circuitry, including, but not limited to one or a combination of microprocessors, microcontrollers, application specific integrated circuits (ASIC), application specific instruction set processor (ASIP), and/or state machines, that communicatively couples to memory 118 and controls the operation of the device 104. The processor 116 may be 8-bit, 16-bit, 32-bit, 64-bit or of any other suitable architecture. The processor 116 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 116 may include other hardware that operates software to control and process information. The processor 116 executes software stored on the memory 118 to perform any of the functions described herein. The processor 116 controls the operation and administration of the device 104 by processing information (e.g., information received from the access node 106, network 108, and memory 118). The processor 116 is not limited to a single processing device and may encompass multiple processing devices.

The memory 118 may store, either permanently or temporarily, data, operational software, or other information for the processor 116. The memory 118 may include any one or a combination of volatile or non-volatile local or remote devices suitable for storing information. For example, the memory 118 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 118, a disk, a CD, or a flash drive. In particular embodiments, the software may include an application executable by the processor 116 to perform one or more of the functions described herein.

The TPM 120 is a chip or circuitry within the device 104 that generates tokens through hashing using a key unique to the TPM 120. For example, the device 104 may be challenged by the access node 106 and/or the identity provider 112 to generate a token. The challenge may include a sequence of bits or characters. The TPM 120 hashes this sequence of bits or characters using the TPM's 120 key to generate the token. The token may then be analyzed to determine the TPM 120 that generated the token, which reveals the identity of the device 104.

The access node 106 controls access to the network 108. After the device 104 connects to the access node 106, the access node 106 facilitates the communication of messages between the device 104 and the network 108. When a device 104 requests a connection from the access node 106, the access node 106 may perform various authentication and authorization processes to determine whether the device 104 should be granted access. The access node 106 uses device information determined, based on a token provided by the TPM 120 of the device 104, to determine whether the device 104 should be allowed to connect to the access node 106. In this manner, the access node 106 tracks the identity of the device 104 and makes appropriate access decisions, even if the device 104 changes or rotates its MAC address.

The device 104 may establish a connection with the access node 106 before the device 104 is allowed to send communications over the network 108 through the access node 106. The access node 106 may broadcast an identifier of the access node 106 or of the network 108. When the user 102 or the device 104 move within a service region of the access node 106, the device 104 may detect the broadcasted identity of the access node 106 or the network 108. The user 102 or the device 104 may then attempt to connect to the network 108 through the access node 106. The access node 106 may then determine whether access should be allowed. For example, the access node 106 may authenticate the user 102 or the device 104 before allowing the connection from the device 104.

As seen in FIG. 1, the access node 106 includes a processor 122 and a memory 124, which are configured to perform any of the functions or actions of the access node 106 described herein.

The processor 122 is any electronic circuitry, including, but not limited to one or a combination of microprocessors, microcontrollers, application specific integrated circuits (ASIC), application specific instruction set processor (ASIP), and/or state machines, that communicatively couples to memory 124 and controls the operation of the access node 106. The processor 122 may be 8-bit, 16-bit, 32-bit, 64-bit or of any other suitable architecture. The processor 122 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 122 may include other hardware that operates software to control and process information. The processor 122 executes software stored on the memory 124 to perform any of the functions described herein. The processor 122 controls the operation and administration of the access node 106 by processing information (e.g., information received from the device 104, network 108, and memory 124). The processor 122 is not limited to a single processing device and may encompass multiple processing devices.

The memory 124 may store, either permanently or temporarily, data, operational software, or other information for the processor 122. The memory 124 may include any one or a combination of volatile or non-volatile local or remote devices suitable for storing information. For example, the memory 124 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 124, a disk, a CD, or a flash drive. In particular embodiments, the software may include an application executable by the processor 122 to perform one or more of the functions described herein.

The access node 106 serves as an entry point to the network 108. The network 108 is any suitable network operable to facilitate communication between the components of the system 100. The network 108 may include any interconnecting system capable of transmitting audio, video, signals, data, messages, or any combination of the preceding. The network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The device 104 and the access node 106 belong to the identity federation 110 (e.g., OpenRoaming), which may be a trusted third party service that is responsible for authenticating the user 102 or the device 104. In these embodiments, the third party service provides the identity provider 112, and the device 104 and the access node 106 rely on the identity provider 112 to authenticate the user 102 and the device 104. For example, when authentication is needed, the access node 106 may open a communication channel between the device 104 and the identity provider 112 through the network 108. The identity provider 112 may then authenticate the device 104. For example, the device 104 may provide credentials (e.g., credentials of the user 102 or of the device 104) to the identity provider 112. The identity provider 112 may use these credentials to authenticate the user 102 or the device 104. The identity provider 112 may then provide an identifier indicating that the user 102 or device 104 is authenticated. The identity provider 112 may provide the identifier to the access node 106 or the device 104. If the identifier is provided to the access node 106, then the access node 106 may use the identifier to determine the identity of the user 102 or the device 104. The access node 106 may then establish a communication session with the device 104. If the identifier is provided to the device 104, the device 104 may communicate the identifier to the access node 106. The access node 106 may then use the identifier to identify the user 102 or the device 104 and to establish a communication session with the device 104. In this manner, the user 102 or device 104 may connect to any access node 106 or network 108 that belongs to the identity federation. Additionally, the access nodes 106 and networks 108 that belong to the identity federation 110 do not need to store and maintain the credentials of the user 102 and device 104. In certain instances, the identifier may not be sufficient to positively identify the device 104 (e.g., if the device 104 changes or rotates its MAC address or if the user 102 provides alternate credentials to the identity provider 112). In particular embodiments, the identity provider 112 and/or the access node 106 further challenge the TPM 120 of the device 104 to generate a token that can be used to determine the identity of the device 104.

In some embodiments, to properly authenticate the device 104, the identity provider 112 or the access node 106 challenges the device 104 with a request to provide a token. In response to that request, the TPM 120 of the device 104 uses an internal key of the TPM 120 to produce the token (e.g., by performing a hash using the internal key). The identity provider 112 or the access node 106 validates the token with the certificate authority 114. As part of that validation process, the certificate authority 114 also provides device information to the identity provider 112 or the access node 106. The access node 106 may then determine the identity of the device 104 based on the device information and make an appropriate access decision for the device 104.

The certificate authority 114 may include one or more devices and/or servers that validate tokens generated by the TPM 120 of the device 104. Additionally, these devices and/or servers provide device information to other components of the system 100 (e.g., the identity provider 112 and the access node 106). The device information may include any suitable information that can be used to identify the device 104. For example, the device information may include an identifier used to track the device 104; times at which the device 104 was previously validated by the certificate authority 114, the identity provider 112, or the access node 106; an identifier for the TPM 120 within the device 104, etc. The certificate authority 114 provides the device information to the identity provider 112 and/or the access node 106. The access node 106 uses the device information to make an appropriate access decision for the device 104.

In operation, the access node 106 initially broadcasts a beacon 126. The beach 126 may be a signal that identifies the access node 106 and specifies initial connection parameters for the access node 106. A device 104 within the broadcast range of the access node 106 may detect the beacon 126. The device 104 may extract information from the beacon 126 to determine how to connect to the access node 106. For example, when the device 104 detects the beacon 126, the device 104 may present the access node 106 to the user 102. The user 102 may then select the access node 106 on the device 104 to attempt to connect to the access node 106.

The device 104 attempts to connect to the access node 106 by communicating a connection request 128 to the access node 106. The connection request 128 may include an identifier for the device 104 and any connection parameters needed by the access node 106 to form the connection with the device 104. For example, the connection request 128 may include a MAC address of the device 104 and an internet protocol (IP) address of the device 104. The connection request 128 may also include an identifier of the user 102 and/or credentials or authentication parameters for the user 102 (e.g., a password or code). The access node 106 may use this information to authenticate the user 102 and/or the device 104. In some embodiments, the access node 106 may use this information to authenticate the user 102 or the device 104 with the identity federation 110.

To confirm the identity of the device 104, the access node 106 communicates a request 130 to the device 104. The request 130 represents a challenge to the TPM 120 of the device 104 to provide a token. The identity provider 112 and/or the access node 106 may have generated the request 130 in response to the connection request 128. In some embodiments, the request 130 includes a nonce value generated by the identity provider 112 and/or the access node 106. The nonce value may be a sequence of bits or characters that are used by the TPM 120 to generate the requested token. If the identify provider 112 generated the request 130, the identity provider 112 communicates the request 130 to the access node 106, and the access node 106 forwards the request 130 to the device 104.

When the device 104 receives the request 130, the TPM 120 of the device 104 uses information within the request 130 to generate a token 132. For example, the TPM 120 may hash the information in the request 130 using a key of the TPM 120 to generate the token 132. In embodiments, where the request 130 includes the nonce value, the TPM module 120 hashes the nonce value with the key of the TPM 120 to generate the token 132. In some embodiments, the token 132 is referred to as a Canary Stamp. The device 104 communicates the token 132 to the access node 106. The access node 106 may then communicate the token 132 to the identity provider 112 and/or the certificate authority 114. In embodiments where the access node 106 communicates the token 132 to the identity provider 112, the identity provider 112 then communicates the token 132 to the certificate authority 114.

The certificate authority 114 validates the token 132 to determine the identity of the device 104. For example, the certificate authority 114 may analyze the token 132 (e.g., perform a reverse hash or decryption) to identify the TPM 120, which identifies the device 104. The certificate authority 114 then provides device information 134 about the device 104. The device information 134 may include identifiers for the device 104, the TPM 120, or the user 102. The device information 134 may also include timestamps that indicate times at which the certificate authority 114, the access node 106, and/or the identity provider 112 previously validated or authenticated the device 104. In some embodiments, the device information 134 includes an identifier for the device 104 that is different from the MAC address of the device 104. The certificate authority 114 communicates the device information 134 to the identity provider 112 and/or the access node 106. In embodiments where the certificate authority 114 communicates the device information 134 to the identity provider 112, the identity provider 112 forwards the device information 134 to the access node 106.

The access node 106 compares the device information 134 with reference information 138 stored in a database 136 to determine the identity of the device 104. For example, the access node 106 may compare identifiers and timestamps within the device information 134 with identifiers in the database 136 to locate reference information 138 that matches the device information 134. The matching reference information 138 includes an identification of a device. The access node 106 may determine that the device identified by the matching reference information 138 is the device 104.

The access node 106 then uses the determined identity to make an access decision 140 for the device 104. For example, the access node 106 may determine, based on the matching reference information 138, that the device 104 has not previously been disconnected due to a network violation. In response, the access node 106 generates the access decision 140 indicating that access is allowed. As a result, the device 104 is allowed to connect to the network 108 through the access node 106. As another example, the access node 106 may determine based on the determined identity that the device 104 should not be granted access. For example, the access node 106 may determine, based on the matching reference information 138, that the device 104 had previously been disconnected from the access node 106 due to a network violation. In response, the access node 106 generates the access decision 140 indicating that the device 104 should not be granted access. As a result, the device 104 is refuse a connection to the access node 106. In this manner, even if the device 104 changes or rotates its MAC address after being disconnected for the network violation, the access node 106 may determine the identity of the device 104 and deny access to the device 104. As a result, the access node 106 protects the network 108 from further network violations, which improves the security and performance of the access node 106 and the network 108, in particular embodiments.

In some embodiments, the access node 106 stores the device information 134 in the database 136. The access node 106 may supplement reference information 138 for the device 104 with information within the device information 134. For example, the access node 106 may update the reference information 138 with the timestamps in the device information 134. As another example, the access node 106 may add identifiers from the device information 134 to the reference information 138. This information may then be used to identify the device 104 if the device 104 attempts to connect again to the access node 106.

Figure 2:
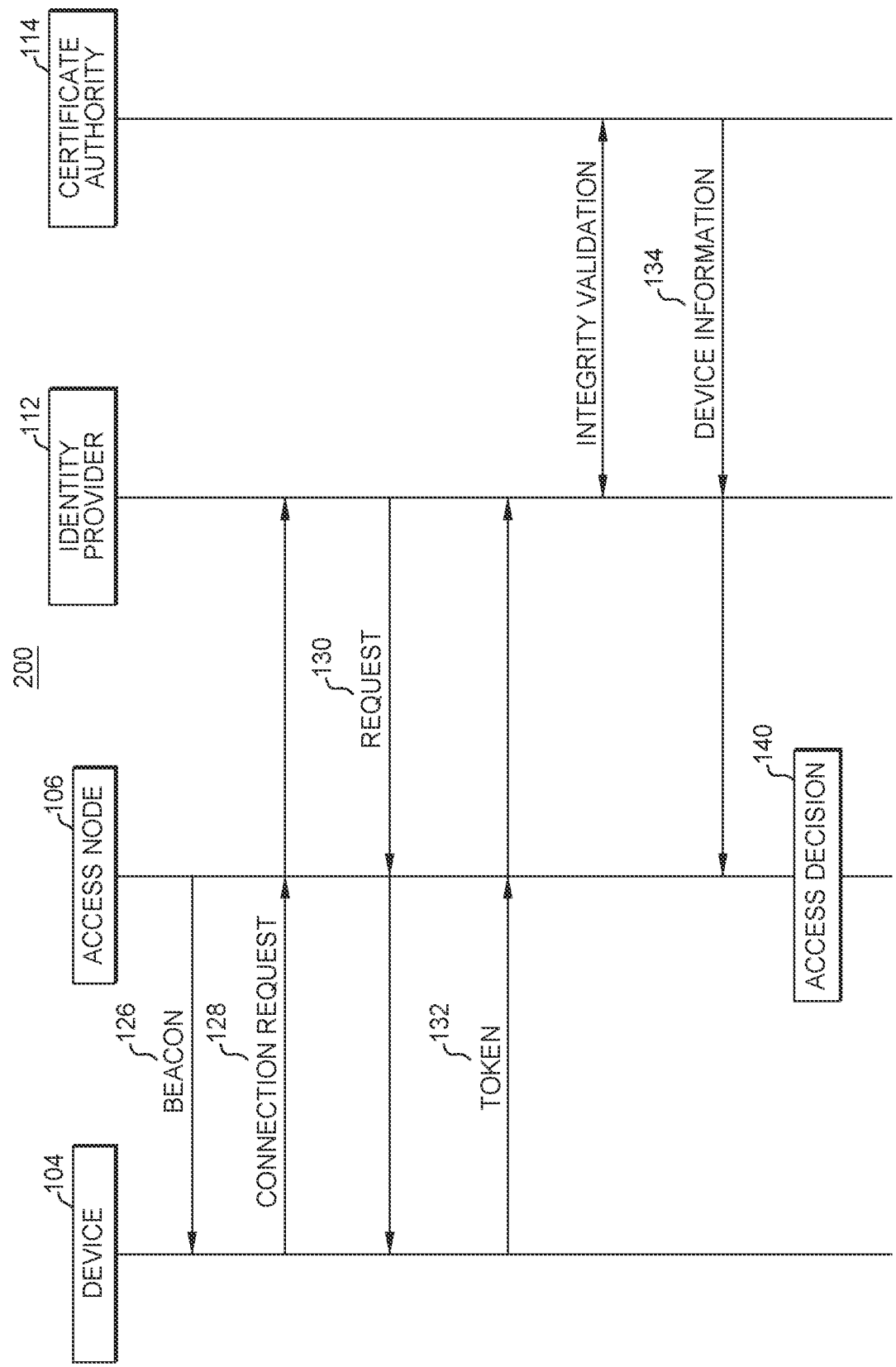
FIG. 2 illustrates an example process flow in the system of FIG. 1.

FIG. 2 illustrates an example process flow 200 in the system 100 of FIG. 1. In the process flow 200, the identity provider 112 challenges the device 104 to generate the token 132 that is used to identify the device 104. In particular embodiments, by performing the process flow 200, the security and performance of the network 108 is improved.

The process flow 200 begins when the access node 106 broadcasts a beacon 126 that is detected by the device 104. The device 104 may analyze the information in the beacon 126 to determine how to connect to the access node 106. A user 102 of the device 104 may instruct the device 104 to connect to the access node 106 using the information in the beacon 126.

The device 104 initiates the connection with the access node 106 by communicating a connection request 128 to the access node 106. The device 104 may generate the connection request 128 using information from the beacon 126. In some embodiments, the access node 106 uses information in the connection request 128 to authenticate the device 104. For example, the access node 106 may communicate the information in the connection request 128 to the identity provider 112. The identity provider 112 authenticates the device 104 using the information in the connection request 128.

Additionally, the identity provider 112 challenges the device 104 to generate the token 132. The identity provider 112 initiates the challenge by communicating a request 130 to the device 104 via the access node 106. The request 130 may challenge a TPM 120 of the device 104 to generate the token 132. In some embodiments, the request 130 includes a nonce value which may be a sequence of bits or characters that the TPM 120 hashes using an internal key to generate the token 132. When the device 104 receives the request 130, the TPM 120 of the device 104 hashes information within the request 130 using a key of the TPM 120 to generate the token 132. The device 104 then communicates the token 132 to the identity provider 112 via the access node 106.

The identity provider 112 then validates the token 132 with the certificate authority 114. In addition to validating the token 132, the certificate authority 114 determines device information 134 based on information within the token 132. For example, the certificate authority 114 may validate that the hash represented by the token 132 was properly generated by the TPM 120 of the device 104. Additionally, the certificate authority 114 may determine the device information 134 for the device 104 after determining the TPM 120 of the device 104 that generated the token 132. The device information 134 may include identifiers for the device 104, the TPM 120, or the user 102. Additionally, the device information 134 may include timestamps that indicate previous instances when the device 104 was validated. The certificate authority 114 communicates the device information 134 to the identity provider 112. The identity provider 112 then communicates the device information 134 to the access node 106.

The access node 106 then analyzes the device information 134 to make an access decision 140. In some embodiments, the access node 106 compares the device information 134 to information in a database 136. For example, the access node 106 may locate, in the database 106, reference information 138 that matches the device information 134. The matching reference information 138 may be linked to a device. The access node 106 then determines the identity of the device 104 as the device linked to the matching reference information 138. The access node 106 then makes the access decision 140 based on the determined identity of the device 104. For example, if the access node 106 determines that the device linked to the matching reference information 138 has not previously committed network violations, then the access node 106 may grant the device 104 access. As another example, if the access node 106 determines that the device linked to the matching reference information 138 had previously committed network violations, then the access node 106 may deny access to the device 104.

Figure 3:
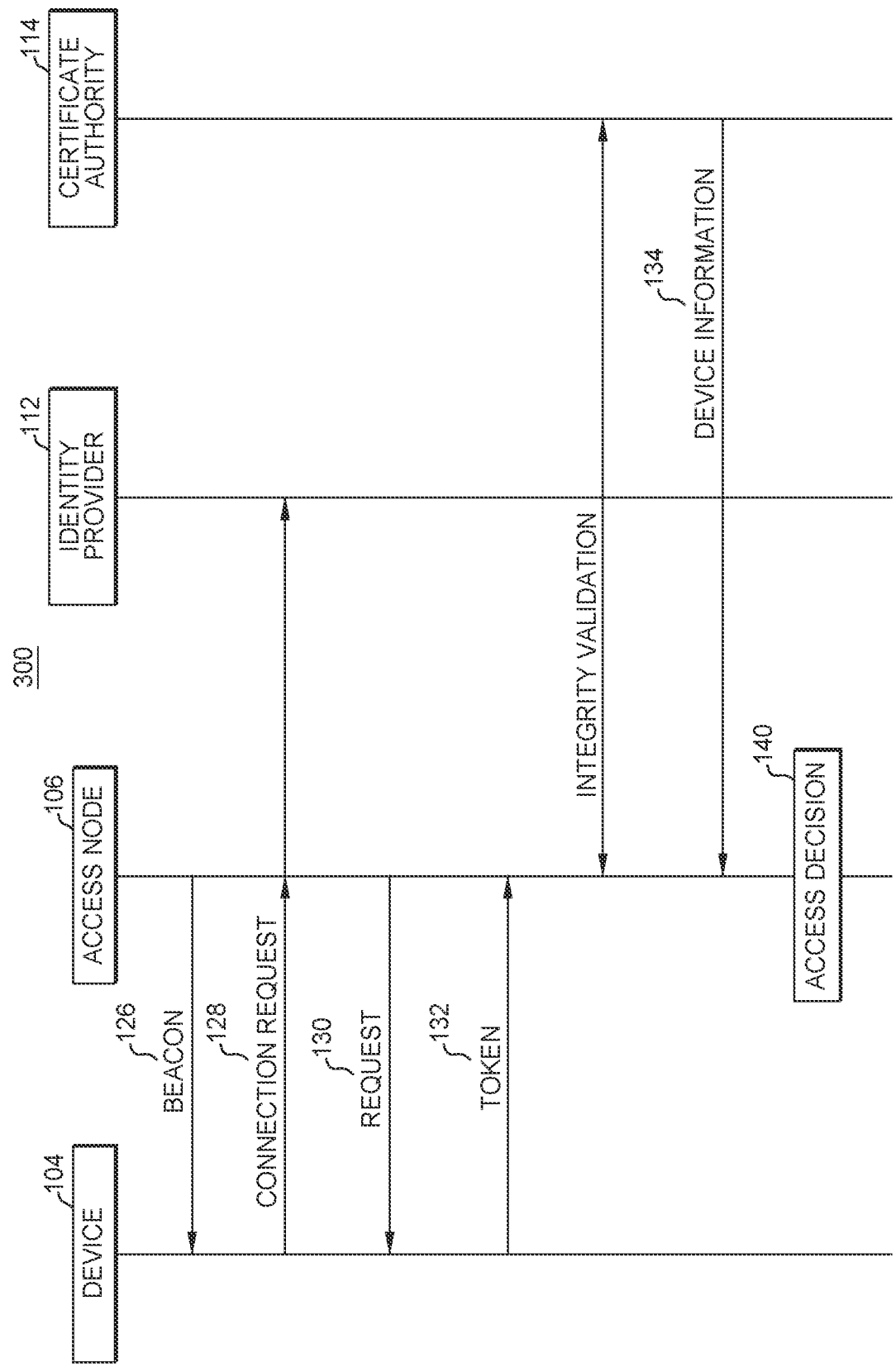
FIG. 3 illustrates an example process flow in the system of FIG. 1.

FIG. 3 illustrates an example process flow 300 in the system 100 of FIG. 1. During the process flow 300, the access node 106 challenges the TPM 120 of the device 104 to generate the token 132 that is used to determine whether the device 104 should be allowed to connect to the access node 106. In particular embodiments, by performing the process flow 300, the security and performance of the network 108 is improved.

The process flow 300 begins when the access node 106 broadcasts a beacon 126. The beacon 126 includes information that devices within the broadcast range of the access node 106 can use to connect to the access node 106. The device 104 detects the beacon 126 and uses the information within the beacon 126 to generate a connection request 128. For example, the user 102 of the device 104 may instruct the device 104 to connect to the access node 126. The device 104 may then use the information within the beacon 126 to generate a connection request 128. The device 104 communicates the connection request 128 to the access node 106 to request a connection. The access node 106 forwards information within the connection request 128 to the identity provider 112. The identity provider 112 may use the information within the connection request 128 to authenticate the device 104 or the user 102.

The access node 106 may also challenge the TPM 120 of the device 104 to generate the token 132. The access node 106 communicates the request 130 to the device 104 to initiate the challenge. The access node 106 may communicate the request 130 to the device 104 before or after the device 104 has been authenticated by the identity provider 112. The request 130 may include a nonce value, such as a sequence of bits or characters. The TPM 120 of the device 104 hashes the nonce value using an internal key of the TPM 120 to generate the token 132. The device 104 communicates the token 132 to the access node 106.

The access node 106 then validates the token 132 with the certificate authority 114. For example, the access node 106 may communicate the token 132 to the certificate authority 114. The certificate authority 114 may then determine whether the nonce value in the request 130 was hashed with the proper key. If the hash in the token 132 is validated, then the certificate authority 114 determines the identity of the device 104 or the TPM 120. The certificate authority 114 then determines device information 134 for the device 104 or the TPM 120. The certificate authority 114 communicates the device information 134 to the access node 106.

The access node 106 makes an access decision 140 based on the device information 134. For example, the access node 106 may compare the device information 134 with information in a database 136 to make the access decision 140. The access node 106 may locate, in the database 136, reference information 138 for a device that matches the device information 134. The access node 106 then determines that the device 104 is the device linked to the matching reference information 138. The access node 106 determines whether to grant or deny access to the device 104. For example, if the device that is linked to the matching reference information 138 has not previously committed network violations, then the access node 106 may grant access to the device 104. As another example, if the device linked to the matching reference information 138 previously committed network violations, then access node 106 may deny access to the device 104.

Figure 4:
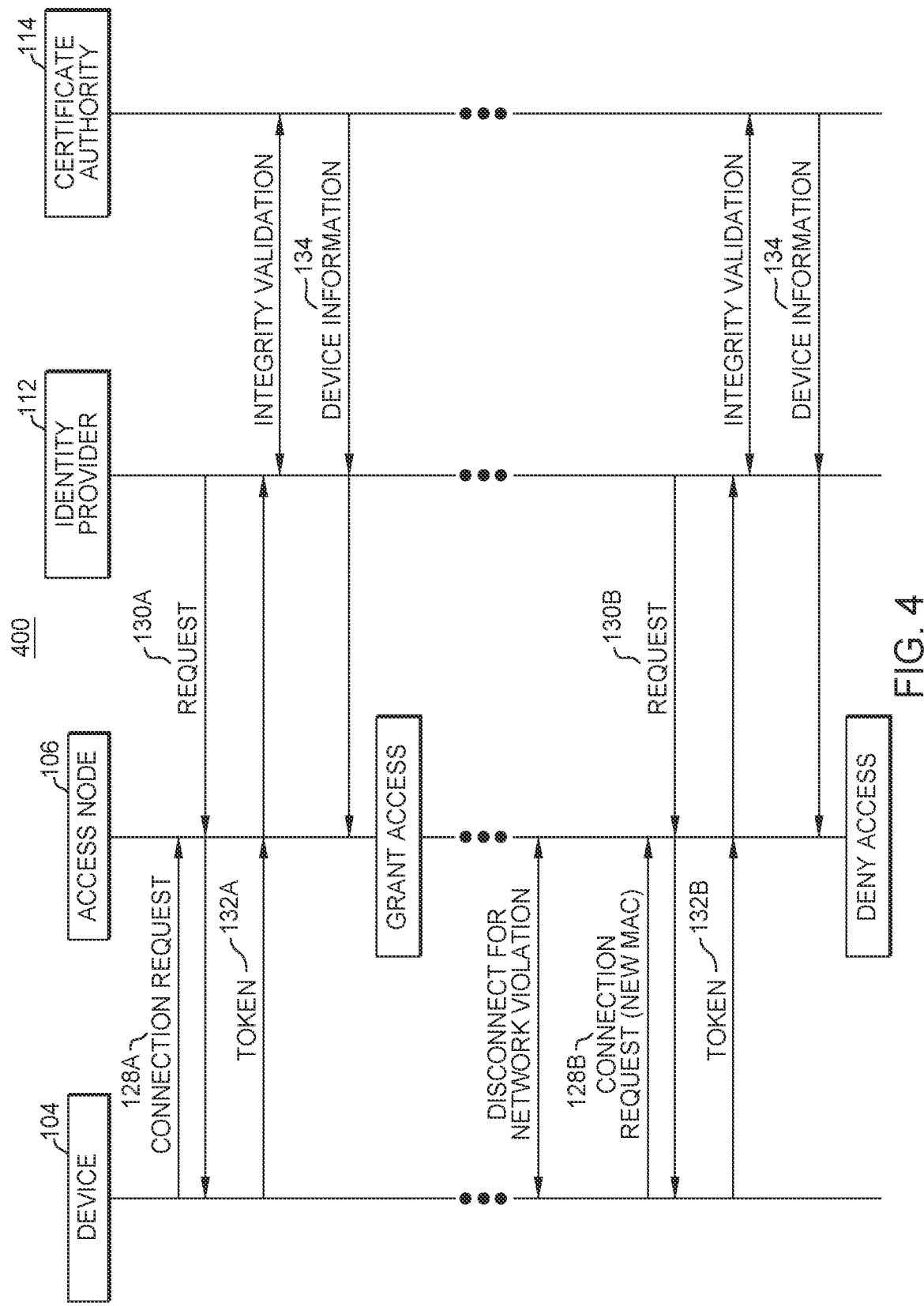
FIG. 4 illustrates an example process flow in the system of FIG. 1.

FIG. 4 illustrates an example process flow 400 in the system 100 of FIG. 1. Generally, the process flow 400 shows how the identity of a device 104 is tracked, even though the device 104 changes or rotates its MAC address. In particular embodiments, by performing the process flow 400, the security and performance of the network 108 is improved.

The process flow 400 begins when the device 104 communicates a connection request 128A to the access node 106. The device 104 may have generated the connection request 128A in response to detecting a beacon 126 broadcast by the access node 106. The connection request 128A may include information that the access node 106 or the identity provider 112 use to authenticate the device 104 or the user 102.

The identity provider 112 challenges the TPM 120 of the device 104 to generate a token 132 that can be used to track the identity of the device 104. The identity provider 112 initiates the challenge by communicating a request 130A to the device 104. In some embodiments, the request 130A includes a nonce value that the TPM 120 of the device 104 hashes using an internal key of the TPM 120 to generate a token 132A. The device 104 communicates the token 132A to the identity provider 112.

The identity provider 112 validates the token 132A with the certificate authority 114. The identity provider 112 may communicate the token 132A to the certificate authority 114. The certificate authority 114 may analyze the information in the token 132A to determine if the information within the request 130A was properly hashed. If the information was properly hashed, then the certificate authority 114 validates the token 132A and determines the identity of the TPM 120 or the device 104. The certificate authority 114 then determines the device information 134 for the device 104 or the TPM 120. The certificate authority 114 communicates the device information 134 to the identity provider 112 and/or the access node 106.

The access node 106 receives the device information 134 from the identity provider 112 and/or the certificate authority 114. The access node 106 uses the device information 134 to make an access decision for the device 104. For example, the access node 106 may compare the device information 134 with reference information 138 in a database. The access node 106 locates, in the database 136, reference information 138 that matches the device information 134. The access node 106 then makes the access decision based on the matching reference information 138. In the example of FIG. 4, the access node 106 initially grants access to the device 104.

Subsequent to granting access to the device 104, the device 104 may commit a network violation. In response, the access node 106 disconnects the device 104 due to the network violation. The access node 106 may update the matching reference information 138 to indicate the network violation and the disconnection.

Subsequent to the disconnection, the device 104 may change or rotate its MAC address. The device 104 then communicates another connection request 128B to the access node 106 to try to reconnect to the access node 106. The connection request 128B may include the new MAC address of the device 104. If the access node 106 tracks the identity of devices using their MAC addresses, then the access node 106 may believe that the connection request 128B is from a different device than the device 104. The access node 106 may communicate the connection request 128B to the identity provider 112 to authentic the device 104 or the user 102.

The identity provider 112 again challenges the TPM 120 of the device 104 to generate a token 132. The identity provider 112 communicates a request 130B to the device 104 via the access node 106. The request 1308 may include a nonce value that the TPM 120 of the device 104 hashes using an internal key of the TPM 120 to generate the token 132B. The device 104 then communicates the token 132B to the identity provider 112.

The identity provider 112 validates the token 132B with the certificate authority 114. The certificate authority 114 may determine, based on information in the token 132B, whether the nonce value was properly hashed or hashed using the proper key. If the certificate authority 114 validates the token 1328, the certificate authority 114 further determines, based on the information in the token 1328, the identity of the device 104 or the TPM 120. The certificate authority 114 then determines device information 134 for the device 104. The certificate authority 114 communicates the device information 134 to the access node 106.

The access node 106 analyzes the device information 134 to make an access decision for the device 104. For example, the access node 106 compares the device information 134 with information in the database 136. The access node 106 may locate in the database 106 reference information 138 that matches the device information 134. When the access node 106 retrieves the matching reference information 138, the access node 106 may determine from the matching reference information 138 that the device 104 had previously been disconnected for committing the network violation. In response, the access node 106 denies access to the device 104. In this manner, the access node 106 tracks the identity of the device 104 even when the device 104 rotates or changes its MAC address.

Figure 5:
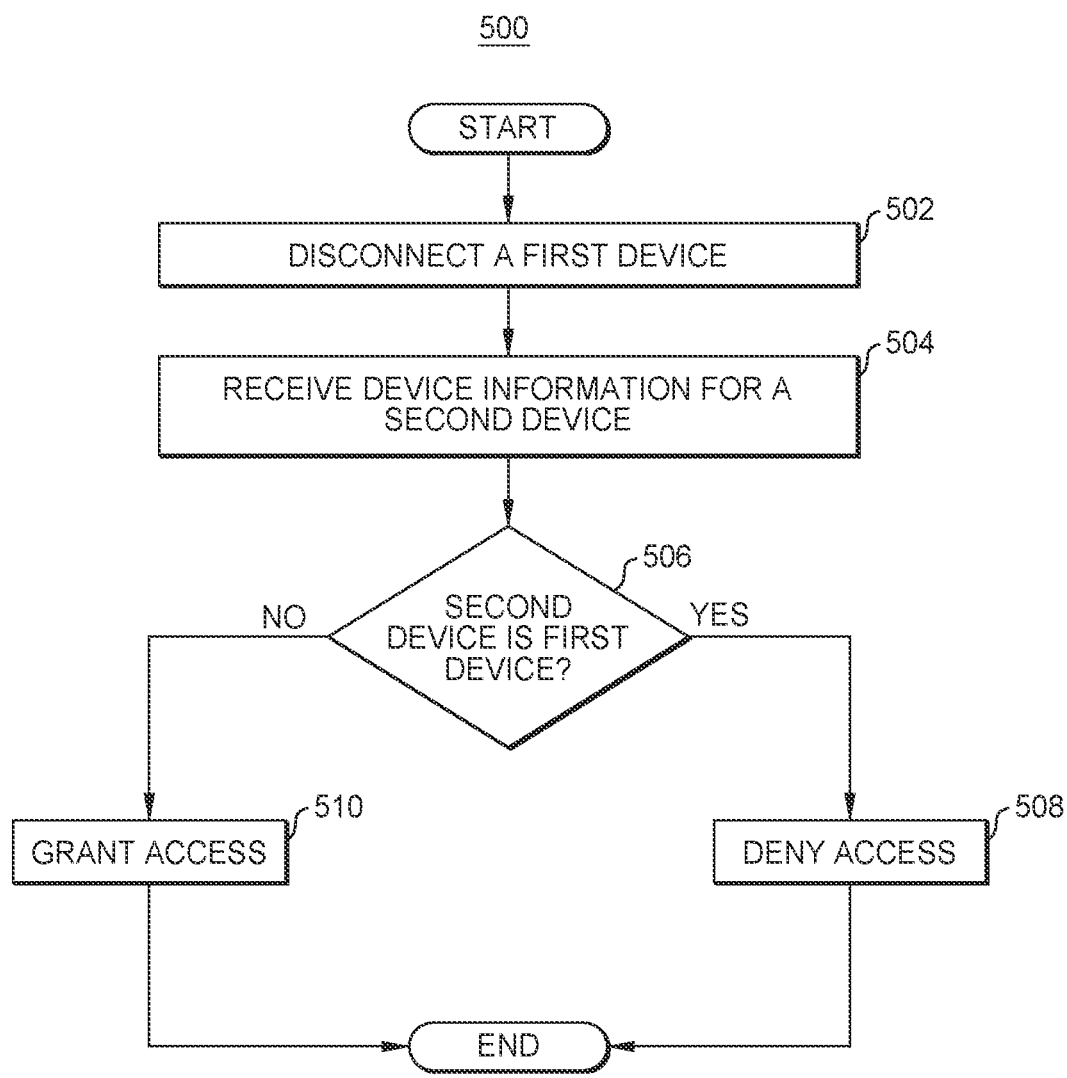
FIG. 5 is a flowchart of an example method in the system of FIG. 1.

FIG. 5 is a flowchart of an example method 500 in the system 100 of FIG. 1. The access node 106 performs the method 500. In particular embodiments, by performing the method 500, the access node 106 improves the security and performance of the network 108.

The access node 106 begins by disconnecting a first device 104 in block 502. The access node 106 may disconnect the first device 104 because the access node 106 determines that the first device 104 committed a network violation.

In block 504, the access node 106 receives device information 134 for a second device 104. The device information 134 may have been determined by a certificate authority 114 based on a token 132 generated by the second device 104. The token 132 may have been generated by a TPM 120 of the second device 104 in response to a challenge initiated by the access node 106 or an identity provider 112. The access node 106 or the identity provider 112 may have initiated the challenge to the TPM 120 of the second device 104 in response to the second device 104 requesting a connection from the access node 106. The TPM 120 of the second device 104 may have hashed a nonce value in the challenge using an internal key of the TPM 120 to generate the token 132. The access node 106 or the identity provider 112 may have communicated the token 132 to the certificate authority 114 for validation. After validating the token 132, the certificate authority 114 may have determined and communicated the device information 134 to the access node 106.

In block 506, the access node 106 determines whether the second device 104 is the first device 104 based on the device information 134. In some embodiments, the access node 106 compares the device information 134 with information in a database 136. The access node 106 locates in the database 136 reference information 138 that matches the device information 134. The reference information 138 may be linked to a device. The access node 106 may determine, based on the matching reference information 138, whether the linked device had previously committed network violations. For example, the access node 106 may determine whether the matching reference information 138 is linked to the first device 104 that was disconnected for a network violation.

If the access node 106 determines that the second device 104 is the first device 104, the access node 106 denies access to the second device 104 in block 508. If the access node 106 determines that the second device 104 is not the first device 104, then the access node 106 may grant access to the second device 104 in block 510. In this manner, the access node 106 may track the identity of the first device 104, even if the first device 104 changes or rotates its MAC address.

Figure 6:
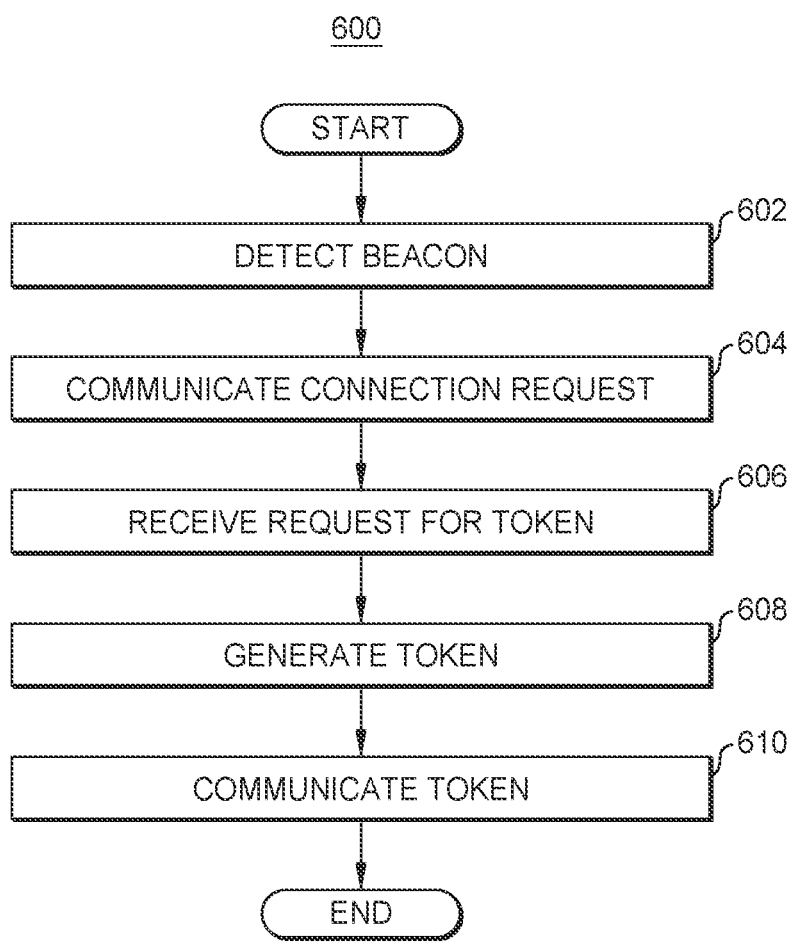
FIG. 6 is a flowchart of an example method in the system of FIG. 1.

FIG. 6 is a flowchart of an example method 600 in the system 100 of FIG. 1. A device 104 may perform the method 600. In particular embodiments, by performing the method 600, the identity of the device 104 may be tracked, even if the device 104 changes or rotates its MAC address.

In block 602, the device 104 detects a beacon 126 broadcast by an access node 106. The beacon 126 may include information that the device 104 uses to connect to the access node 106. In block 604, the device 104 communicates a connection request 128 to the access node 106. The device 104 may generate the connection request 128 using information from the beacon 126.

In block 606, the device 104 receives a request 130 for a token 132. The request 130 may have been generated by the access node 106 or an identity provider 112. In block 608, the device 104 generates the token 132. In some embodiments, the request 130 includes a nonce value, which may be a sequence of bits or characters that the device 104 uses to generate the token 132. For example, a TPM 120 of the device 104 may hash the nonce value using an internal key of the TPM 120 to generate the token 132.

In block 610, the device 104 communicates the token 132 to the access node 106 and/or the identity provider 112. The access node 106 and/or the identity provider 112 then validate the token 132 with a certificate authority 114. The certificate authority 114 may validate the token 132 and provide device information 134 about the device 104. The access node 106 uses the device information 134 to determine an identity of the device 104. The access node 106 then makes an access decision based on the device information 134. In this manner, the access node 106 may determine and track the identity of the device 104, even if the device 104 changes or rotates its MAC address.

In summary, this disclosure describes a process by which an access node 106 tracks the identity of a user device 104 even if the user device 104 rotates or changes its MAC address. When the device 104 attempts to connect to the access node 106, the access node 106 or an identity provider 112 of an identity federation 110 communicates a request 130 to the user device 104 to challenge the user device 104 to provide a token 132 generated by the TPM 120 of the user device 104. The user device 104 generates and communicates the token 132 to the access node 106 or the identity provider 112. The access node 106 or the identity provider 112 than validate the token 132 with a certificate authority 114. The certificate authority 114 also communicates, to the access node 106 or the identity provider 112, information 134 that identifies the user device 104. The access node 106 compares this information 134 with information 138 in a database 136 to determine whether the user device 104 is a device that was previously disconnected due to a network violation. The access node 106 then makes an access decision 140 for the user device 104. In this manner, the access node 106 can determine the identity of the user device 104 even if the user device 104 rotates or changes MAC addresses.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
   disconnecting, by an access node, a first device having a first media access control (MAC) address due to a network violation;
   in response to receiving a connection request for a second device having a second MAC address different from the first MAC address to connect to the access node, communicating a nonce value to the second device;
   receiving, by the access node and from the second device, a hash of the nonce value generated by a trusted platform module of the second device;
   determining, by the access node and based on the hash of the nonce value, that the second device is the first device; and
   denying, by the access node, the connection request based on determining that the second device is the first device.

2. The method of claim 1, further comprising storing information about the first device in a database, wherein the information about the first device is generated by a certificate server based on a token generated by the first device.

3. The method of claim 2, wherein determining that the second device is the first device comprises comparing information about the second device determined based on the hash to the information about the first device in the database.

4. The method of claim 3, wherein the information about the second device is generated by a certificate server after the hash is validated.

5. The method of claim 1, further comprising:
   receiving, by the access node, the connection request from the second device; and
   in response to receiving the connection request, establishing a connection with an identity provider, wherein the second device, the access node, and identity provider are members of an identity federation.

6. An access node comprising:
   a memory; and
   a hardware processor communicatively coupled to the memory, the hardware processor configured to:
   disconnect a first device having a first MAC address due to a network violation;
   in response to receiving a connection request for a second device having a second MAC address different from the first MAC address to connect to the access node, communicate a nonce value to the second device;
   receive, from the second device, a hash of the nonce value generated by a trusted platform module of the second device;
   determine, based on the hash of the nonce value, that the second device is the first device; and
   deny the connection request based on determining that the second device is the first device.

7. The access node of claim 6, wherein the hardware processor is further configured to store information about the first device in a database, wherein the information about the first device is generated by a certificate server based on a token generated by the first device.

8. The access node of claim 7, wherein determining that the second device is the first device comprises comparing information about the second device determined based on the hash to the information about the first device in the database.

9. The access node of claim 8, wherein the information about the second device is generated by a certificate server after the hash is validated.

10. The access node of claim 6, wherein the hardware processor is further configured to:
    receive, by the access node, the connection request from the second device; and
    in response to receiving the connection request, establish a connection with an identity provider, wherein the second device, the access node, and identity provider are members of an identity federation.

* * * * *